(12) United States Patent
Okazaki et al.

(10) Patent No.: US 12,401,240 B2
(45) Date of Patent: Aug. 26, 2025

(54) ROTARY ELECTRIC MACHINE INCLUDING ROTOR WITH SKEW AND STATOR IN WHICH TOP WIDTH OF TEETH IS SET BASED ON SKEW ANGLE

(71) Applicant: Mitsubishi Electric Corporation, Tokyo (JP)

(72) Inventors: Kodai Okazaki, Tokyo (JP); Junji Kitao, Tokyo (JP); Yoshihiro Miyama, Tokyo (JP); Kengo Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 230 days.

(21) Appl. No.: 17/887,691

(22) Filed: Aug. 15, 2022

(65) Prior Publication Data

US 2023/0120571 A1    Apr. 20, 2023

(30) Foreign Application Priority Data

Oct. 15, 2021  (JP) .................................. 2021-169315

(51) Int. Cl.
*H02K 1/276* (2022.01)
*H02K 29/03* (2006.01)

(52) U.S. Cl.
CPC ............. *H02K 1/276* (2013.01); *H02K 29/03* (2013.01); *H02K 2201/06* (2013.01); *H02K 2213/03* (2013.01)

(58) Field of Classification Search
CPC ...... H02K 1/276; H02K 1/2766; H02K 1/278; H02K 29/03; H02K 2201/06; H02K 2213/03

(Continued)

(56) References Cited

U.S. PATENT DOCUMENTS 4,873,462 A * 10/1989 Harned ................. H02K 21/20
                                                        310/49.36
2010/0119390 A1* 5/2010 Baba .................... H02K 21/16
                                                        310/156.53

(Continued)

FOREIGN PATENT DOCUMENTS

JP  2010-166810 A    7/2010
JP  2010-263786 A    11/2010

(Continued)

OTHER PUBLICATIONS

Communication dated Nov. 8, 2022, issued in Japanese Application No. 2021-169315.

*Primary Examiner* — Michael Andrews
(74) *Attorney, Agent, or Firm* — Sughrue Mion, PLLC (57) ABSTRACT

A rotary electric machine comprises: a rotor which has a rotor core and permanent magnets arranged in the rotor core on its outer circumference side, and which is supported rotatably; and a stator which has a stator core having teeth projecting toward a radial center and arranged circumferentially, and which is located coaxially with the rotor to be spaced apart from the outer circumferential surface of the rotor; wherein, on a condition that a ratio of the circumferential width of each of sub poles to the circumferential width of each of main poles is 0.625 or less, a top width of each of the teeth is set on the basis of two calculation formulas to be used differently according to the rotor skew angle.

12 Claims, 9 Drawing Sheets

(58) Field of Classification Search
USPC .................................................. 310/156.47
See application file for complete search history.

(56) References Cited

U.S. PATENT DOCUMENTS

| | | |
|---|---|---|
| 2015/0091407 A1 | 4/2015 | Kayano et al. |
| 2015/0357870 A1* | 12/2015 | Hazeyama ........... H02K 1/2766 |
| | | 310/156.07 |
| 2019/0036387 A1* | 1/2019 | Hazeyama ............. H02K 29/03 |
| 2020/0266692 A1* | 8/2020 | Trumper .................. H02K 1/34 |

FOREIGN PATENT DOCUMENTS

| | | |
|---|---|---|
| JP | 2021-93879 A | 6/2021 |
| WO | 2013/175575 A1 | 11/2013 |
| WO | 2014/115655 A1 | 7/2014 |

\* cited by examiner

ROTARY ELECTRIC MACHINE INCLUDING ROTOR WITH SKEW AND STATOR IN WHICH TOP WIDTH OF TEETH IS SET BASED ON SKEW ANGLE

BACKGROUND OF THE INVENTION

1. Field of the Invention

The present application relates to a rotary electric machine.

2. Description of the Background Art

Motors (rotary electric machines) for use in electrified vehicles, such as hybrid electric vehicles and the like, are each required to have a high-power characteristic which makes it possible, in a limited in-vehicle space, to generate a specified torque in a wide rotational-speed range of 0 to 10000 rpm. In this regard, for the magnetic poles of its rotor, it is conceivable to employ, as a structure capable of easily improving a torque characteristic, a Halbach array structure in which radially-magnetized main poles each being one of the magnetic poles and circumferentially-magnetized sub poles, are alternately arranged in the circumferential direction of the rotor.

Meanwhile, although the torque is generated by a magnetic attractive force induced between the stator and the rotor, because the magnetic attractive force varies depending on the position of the rotor, there is a problem that, when the variation frequency is matched to the natural frequency of the exterior of the stator, a noise will be generated due to resonant vibration. In particular, there is a problem that, when resonant vibration occurs due to variation of such a magnetic attractive force that is caused by the fundamental wave component of the permeance of the stator, the fundamental wave component of the magneto-motive force of the rotor and/or the harmonic magnetic-flux component generated due to modulation effect with a harmonic component, a large noise will be generated.

For dealing with that problem, there is proposed a technique in which, in the Halbach array structure, the magnetization direction of each of the sub poles is inclined from the circumferential direction toward the magnetization direction of each of the main poles, to make the waveform of the radial magnetic-flux density in the magnetic gap region more similar to a sinusoidal waveform, to thereby achieve increased power and noise reduction at the same time (see, for example, Patent Document 1).

Patent Document 1: International Publication No. WO 2013/175575 (Paragraphs 0014 to 0023; FIG. 1 to FIG. 3)

However, magnetizing the sub pole that is a cuboid-shaped permanent magnet by changing the magnetization direction to any given direction, is highly difficult in terms of manufacturing, resulting in increased manufacturing cost. Further, it is assumed that a deviation in the magnetization direction occurs due to a shape tolerance at the time of the shaping process of the permanent magnet and/or due to the magnetization process itself. The deviation per magnetic pole serves as a factor for a low-order harmonic magnetic-flux component, and thus may be a new cause of increased noise. Namely, a noise reduction effect caused by the adjustment of the magnetization direction of the sub pole is a limited effect.

SUMMARY OF THE INVENTION

This application discloses a technique for solving such a problem as described above, and an object thereof is to provide a rotary electric machine which is easy to manufacture and which can achieve increased power and noise reduction at the same time.

A rotary electric machine disclosed in this application is characterized by comprising:

a rotor which has an annular rotor core and multiple magnetic poles arranged in/on the rotor core on an outer circumferential side thereof, and which is supported rotatably, said multiple magnetic poles being composed of main poles formed of permanent magnets whose magnetic fluxes at their respective magnetic-pole centers are each directed radially and sub poles whose magnetic fluxes at their respective magnetic-pole centers are each directed circumferentially, or being composed of the main poles without having the sub poles; and a stator which forms a ring shape, which has a stator core having teeth projecting toward a radial center and arranged circumferentially and armature windings wound on the respective teeth, and which is located coaxially with the rotor to be spaced apart from an outer circumferential surface of the rotor;

wherein, on a condition that a ratio of a circumferential width of each of the sub poles to a circumferential width of each of the main poles is 0.625 or less, provided that in a case without having the sub poles, the circumferential width of the sub pole is regarded as zero, a top width of each of the teeth that is to be defined using an electric angle, is set on a basis of a calculation value Vc which is obtained, assuming that a rotor skew angle of the rotor is X degrees as an electric angle, provided that in a case where no skew is formed in the rotor, the skew angle is regarded as zero degree, by a following formula (1) when $X \leq 13.6$, and by a following formula (2) when $X > 13.6$.

$$Vc = 0.276X + 69.0 \tag{1}$$

$$Vc = -0.391X + 78.0 \tag{2}$$

According to the rotary electric machine disclosed in this application, since the top width of each of the teeth is set on the basis of two calculation formulas to be used differently according to the rotor skew angle, the noise due to the harmonic magnetic flux in the magnetic gap region can be reduced. Thus, it is possible to provide a rotary electric machine which is easy to manufacture and which can achieve increased power and noise reduction at the same time.

DETAILED DESCRIPTION OF THE EMBODIMENTS OF THE INVENTION

Embodiment 1

Figure 1:
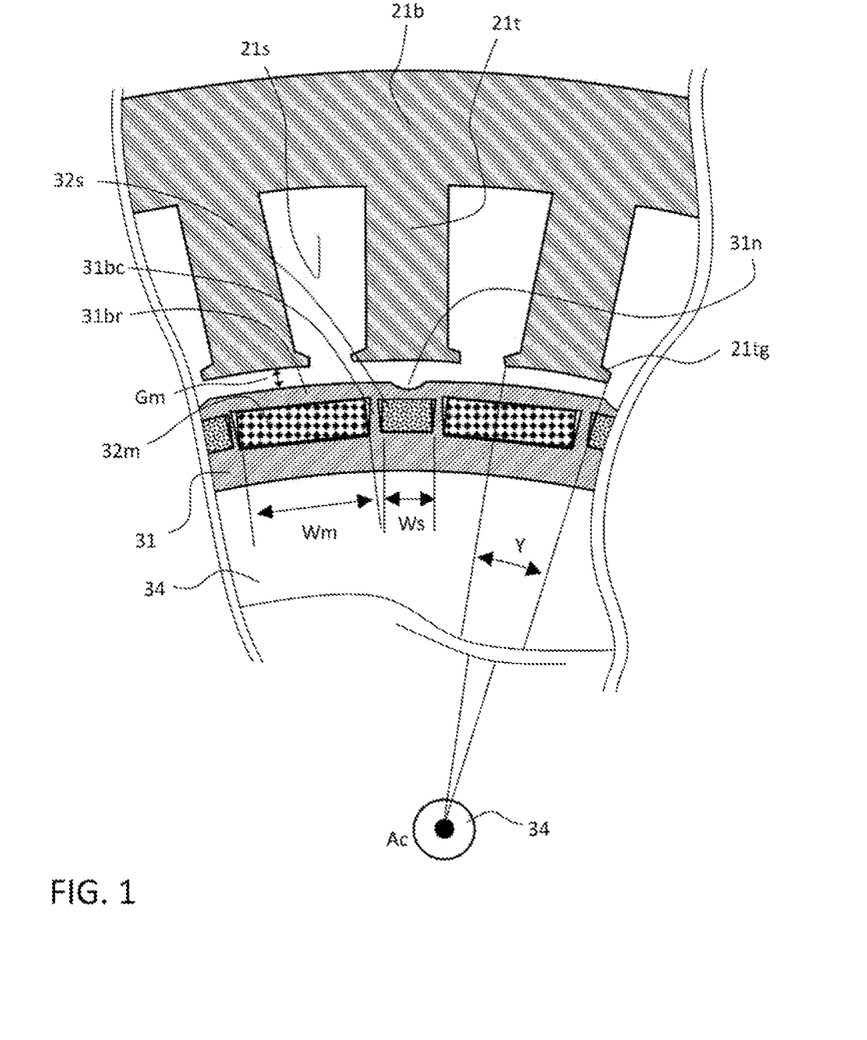
FIG. 1 is a partial sectional view for illustrating a configuration of a rotary electric machine according to Embodiment 1, in which a part of a cross-section thereof perpendicular to its axis is shown in an enlarged manner.
Figure 2:
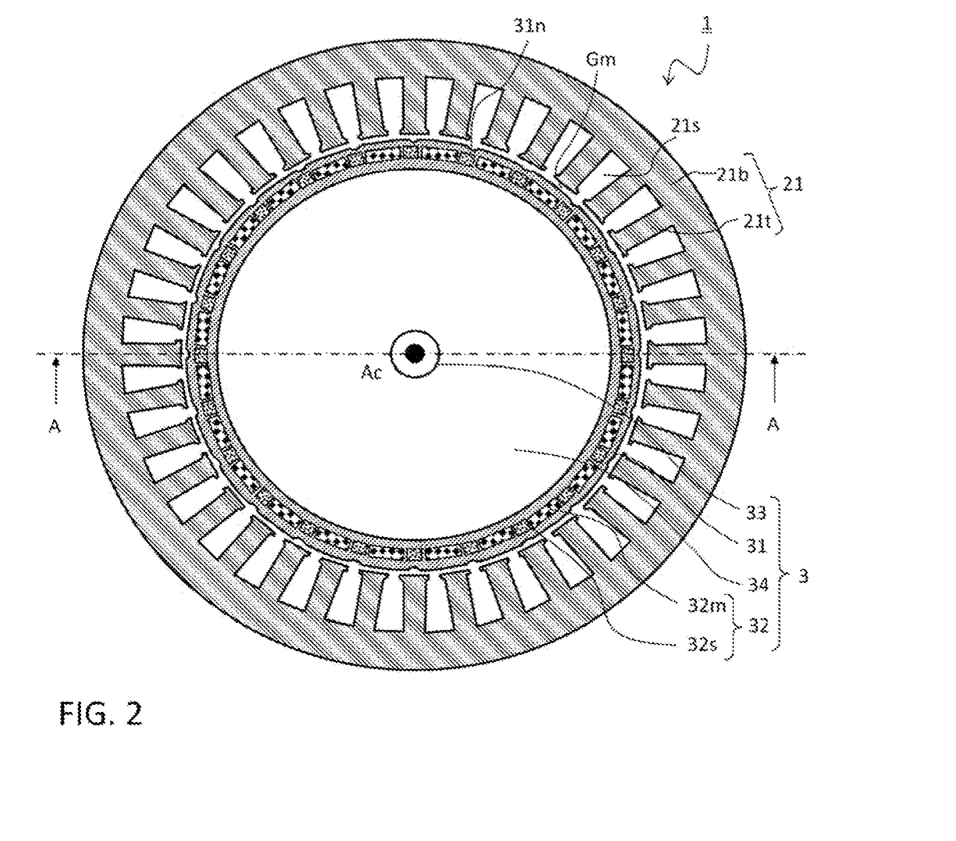
FIG. 2 is a sectional view perpendicular to the axis for illustrating the configuration of the rotary electric machine according to Embodiment 1.
Figure 3A:
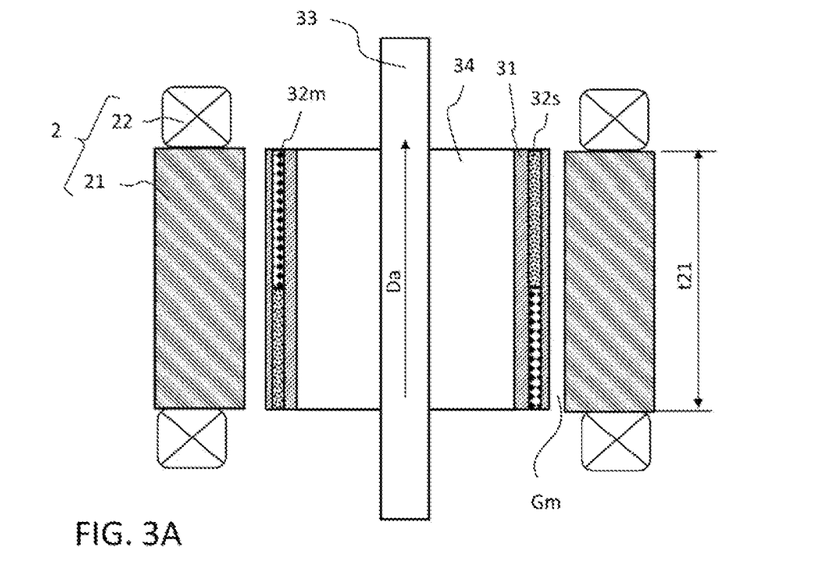
FIG. 3A and FIG. 3B are a sectional view along the axis and a side view of a rotor core, respectively, for illustrating the configuration of the rotary electric machine according to Embodiment 1.
Figure 3B:
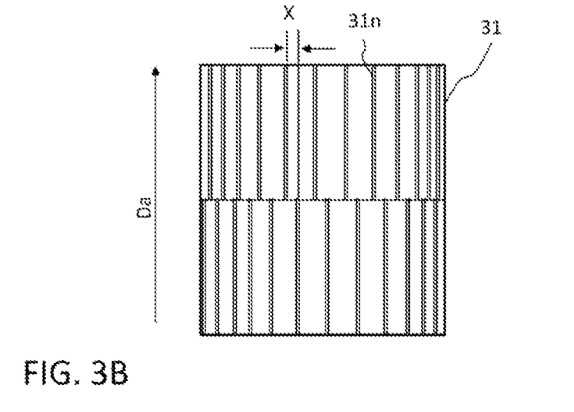

FIG. 1 to FIG. 6 serve for explaining configurations of a rotary electric machine according to Embodiment 1 and operations thereof, in which FIG. 1 to FIG. 3A, FIG. 3B are used for illustrating the configurations of the rotary electric machine and the definition of a tooth top width. Further, FIG. 1 is a partial sectional view in which a regional part of a cross-section of the rotary electric machine perpendicular to the axis thereof, corresponding to a pair of magnetic poles, is shown in an enlarged manner; FIG. 2 is a sectional view of the rotary electric machine perpendicular to the axis; FIG. 3 is a sectional view of the rotary electric machine along the axis, according to an A-A line in FIG. 2; and FIG. 3B is a side view of a rotor core in the same line of sight as in FIG. 3A. Note that, in FIG. 1 and FIG. 2, armature windings are omitted from illustration, and in FIGS. 1 to 3, members such as a housing, etc. are omitted from illustration.

Figure 4:
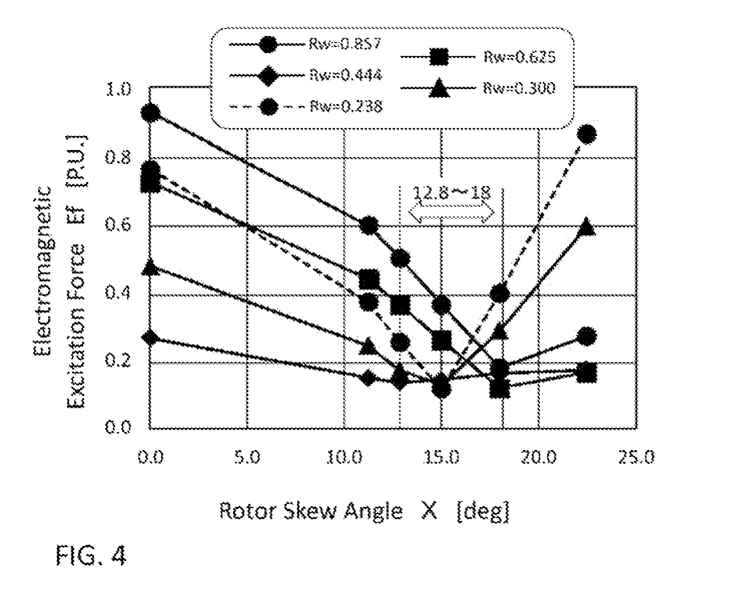
FIG. 4 is a table showing a relationship between a rotor skew angle and a zero-order spatial and sixth-order temporal component of an electromagnetic excitation force, for each of five different patterns about a ratio between a main pole width and a sub pole width.
Figure 5:
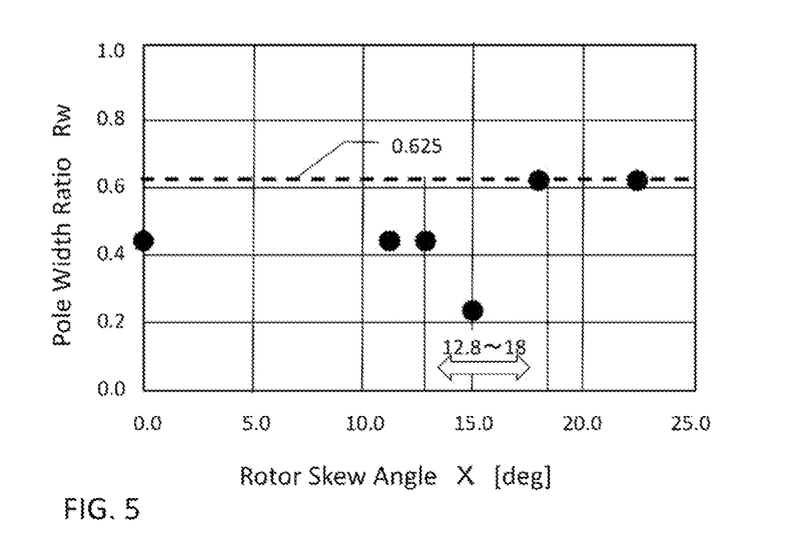
FIG. 5 is a table showing a relationship between a rotor skew angle and a ratio between widths of the main pole and the sub pole at which a zero-order spatial and sixth-order temporal component of an electromagnetic excitation force becomes minimum.
Figure 6:
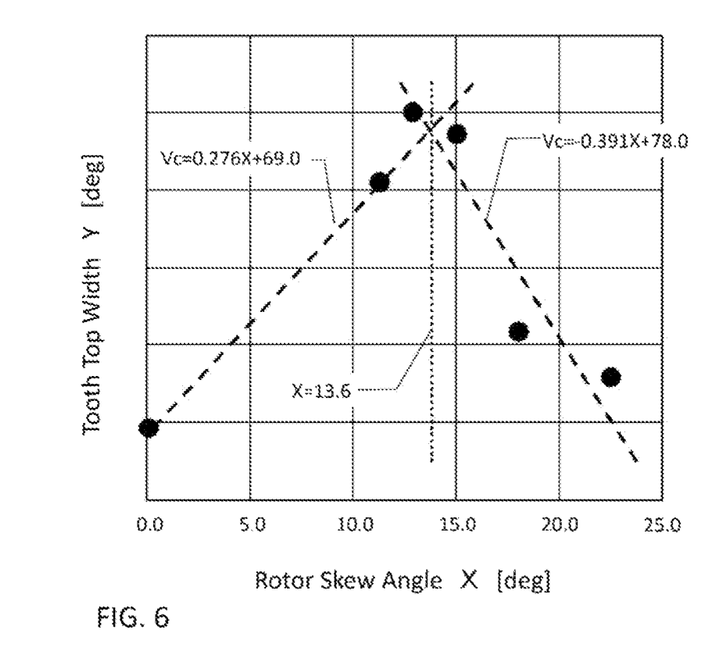
FIG. 6 is a table showing a relationship between a rotor skew angle and a tooth top width at which a zero-order spatial and sixth-order temporal component of an electromagnetic excitation force becomes minimum.

Further, FIG. 4 to FIG. 6 serve for explaining how the tooth top width is set based on a rotor skew angle, in which FIG. 4 is a diagram in line-graph form, showing a relationship between a rotor skew angle and a zero-order spatial and sixth-order temporal component of an electromagnetic excitation force (P.U.), for each of five patterns in which a ratio of a sub pole width to a main pole width is varied from 0.238 to 0.857; FIG. 5 is a diagram in graph form, showing a relationship between a rotor skew angle in a range from 0 degree to 25 degrees and a ratio between the main pole width and the sub pole width at which a zero-order spatial and sixth-order temporal component of an electromagnetic excitation force becomes minimum; and FIG. 6 is a diagram in line-graph form, showing a relationship between a rotor skew angle in a range from 0 degree to 25 degrees and a tooth top width at which a zero-order spatial and sixth-order temporal component of an electromagnetic excitation force becomes minimum.

Hereinafter, description will be made based on the figures; however, prior to describing characteristic parts of the rotary electric machine of this application, a fundamental configuration of a rotary electric machine having a Halbach array structure will be described.

As shown in FIG. 2 and FIG. 3A, a rotary electric machine 1 according to Embodiment 1 includes a stator 2 and a rotor 3 rotatably provided inside the stator 2. The rotary electric machine further includes, on the outside of the stator 2, an unshown frame and an unshown housing that is fixed thereto by a plurality of bolts so as to cover an open portion of the frame on its one side.

The stator 2 has a stator core 21 composed of stacked stator-core sheets each formed of a magnetic member such as a magnetic steel sheet or the like, and armature windings 22 stored in the stator core 21. The stator core 21 has an annular core back 21b and total 36 teeth 21t each extending from the core back 21b toward a magnetic gap region Gm, so that a slot 21s is created between each set of adjacent teeth 21t.

The rotor 3 is rotatable because its shaft 33 as a rotating shaft is supported at both end portions thereof by a first bearing fit into the unshown housing and a second bearing fit into an unshown wall part. Here, the rotor has a radially-inner structure part 34 through which the shaft 33 penetrates; a rotor core 31 located on the outer circumferential side of the radially-inner structure part 34; and cuboid-shaped permanent magnets 32 arranged inside the rotor core 31 along the circumferential direction thereof. Namely, the rotary electric machine 1 constitutes an IPM motor (Interior Permanent Magnet motor) in which the permanent magnets 32 are embedded in the rotor core 31. Further, the rotor 3 is composed of 24 magnetic poles, namely, 12 sets of magnetic pole pairs (the number of pole pairs=12).

Further, in one magnetic pole pair, main poles 32m composed of permanent magnets whose magnetic orientation is parallel to the radial direction and sub poles 32s composed of permanent magnets whose magnetic orientation is parallel to the circumferential direction are alternately adjacent to each other, and the magnetization direction of the sub pole 32s is set so that the magnetic flux is concentrated at a circumferential center position of the main pole 32m. Thus, the rotor core has a Halbach array structure. Furthermore, in order to reduce the torque ripple, on the magnetic-gap facing portions of the rotor core 31 (on the outer circumferential surface thereof), cutouts 31n are each formed using a circumferential center position of the sub pole 32s as a reference position.

Although the rotary electric machine 1 of this application is not limited to that having the above Halbach array structure, the characteristic parts of the rotary electric machine 1 according to Embodiment 1 will be described assuming that it has the Halbach array structure. As shown in FIG. 1, the circumferential width of the sub pole 32s is defined as a sub pole width Ws [mm] and the circumferential width of the main pole 32m is defined as a main pole width Wm [mm]. According to these definitions, as a relationship between the sub pole 32m and the sub pole 32s, a ratio of the sub pole width Ws to the main pole width Wm (a magnetic-pole width ratio Rw=Ws/Wm), is set to have a value of 0.625 or less.

Further, an angle formed by a line that connects between one circumferential end of the top portion of one tooth 21t facing the magnetic gap region Gm and an axial center Ac of the rotor 3, and a line that connects between the other circumferential end and the axial center Ac of the rotor 3, is defined as a tooth top width Y [deg] as an electric angle. As shown in FIG. 3B, the rotary electric machine 1 according to Embodiment 1 has a two-step rotor skew in an axial direction Da, so that, here, an angle by which a basic cross-sectional shape of the rotor is shifted in a clockwise (CW) direction or counter-clockwise (CCW) direction, is defined as a rotor skew angle X [deg] as an electric angle.

Then, the tooth top width Y is set according to the value of the rotor skew angle X, as shown below. Depending on a condition whether or not the rotor skew angle X is not more than 13.6 degrees (this angle applies even in a case where no skew is formed (X=0)), either one of two linear formulas (formulas (1), (2) to be described later) using the rotor skew angle X as a parameter, is selected according to the value of the rotor skew angle X. Then, the tooth top width Y is set using a calculation value Vc calculated by the selected formula.

Operations of the rotary electric machine 1 having the above configuration (reasons why such a setting value is determined) will be described. First of all, a relationship between the rotor skew angle X and a zero-order spatial and sixth-order temporal component of an electromagnetic excitation force (hereinafter, referred to as an electromagnetic excitation force Ef) is investigated. Here, the tooth top width Y at which the electromagnetic force Ef becomes minimum is determined for each of given magnetic-pole width ratios Rw and rotor skew angles X under a predetermined current load condition. As shown in FIG. 4, when the stator 2 is constituted with the thus-determined tooth top width Y, the relationship of the electromagnetic force Ef to the rotor skew angle X varies depending on the magnetic-pole width ratio Rw.

In a range of the magnetic-pole width ratio Rw from 0.857 (indicated by circles with solid lines) to 0.444 (indicated by diamonds), there is a tendency that, as the magnetic-pole width ratio Rw becomes smaller, the electromagnetic excitation force Ef is reduced as a whole and also the sensitivity to the rotor skew angle X becomes lower. Furthermore, in a range of the magnetic-pole width ratio Rw from 0.444 to 0.238 (indicated by circles with broken lines), although the sensitivity to the rotor skew angle X becomes higher again as the magnetic-pole width ratio Rw becomes smaller, the rotor skew angle X at which the electromagnetic force Ef becomes minimum, falls in a range around 15 degrees.

This is because, when the magnetic-pole width ratio Rw is a prescribed value (in this Embodiment, Rw=0.444), a magnetic-flux density harmonic component becomes minimum and thus the absolute value thereof becomes smaller, so that the sensitivity of the electro-magnetic excitation force Ef to a change in the rotor skew angle X becomes relatively lower. It is desired that the rotor skew angle X be an angle as small as possible, because, when it is set large, the output torque will be reduced due to phase shifting of the fundamental wave, even though an effect of suppressing the electromagnetic excitation force Ef and the torque ripple caused by the harmonic component may be created.

Further, in general three-phase rotary electric machines, the torque-ripple sixth order component is one of main factors for vibration/noise. Thus, when, taking into account a distortion in the waveform of the magnetic flux density, the rotor skew angle X is given as an electric angle that is somewhat shifted from 15 degrees (=360/6/2/2) as a center, it is possible to cause phase-inversed waveforms to be added and thus counteracted to each other, to thereby reduce the vibration/noise.

In light of the foregoing, in order to cause both the electromagnetic excitation force Ef and the torque-ripple sixth order component to be established without a marked reduction in the output torque, the rotor skew angle X is set in the following range. Namely, it is effective that the rotor skew angle is set to be not less than 12.8 degrees (=360/7/2/2) that is an angle at which a seventh-order temporal component as a magnetic-flux density component in the magnetic gap region Gm will be cancelled, and not more than 18 degrees (=360/5/2/2) at which a fifth-order temporal component as the density component will be cancelled.

Next, a setting range of the magnetic-pole width ratio Rw will be investigated on the basis of a relationship between a rotor skew angle X and a magnetic-pole width ratio Rw at which the electro-magnetic excitation force Ef becomes minimum, by using selected magnetic-pole width ratios Rw corresponding to minimum electro-magnetic excitation forces Ef that are each plotted in FIG. 4 for each rotor skew angle X. As shown in FIG. 5, it is found that, in a range of the rotor skew angle X from 0 degree to 25 degrees, in particular, in a range of the rotor skew angle X not less than 12.8 degrees and not more than 18 degrees at which the torque-ripple sixth order component can also be reduced concurrently, the magnetic-pole width ratio Rw has a value of 0.625 or less.

As has been described using FIG. 4, when the magnetic-pole width ratio Rw is small, the rotor skew angle X at which the electromagnetic force Ef becomes minimum has a small value, so that the output torque reduction is suppressed. Thus, it is desired that the main pole width Wm and the sub pole width Ws be determined so that the magnetic-pole width ratio Rw becomes 0.625 or less.

Accordingly, in Embodiment 1, for the case where the stator 2 is formed using a single tooth top width Y, how to set the value of the tooth top width Y is investigated. Here, assuming that the stator 2 is constituted using the single tooth top width Y, the investigation is made on the basis of a relationship between a rotor skew angle X and a tooth top width Y at which the electromagnetic force Ef becomes minimum, by using magnetic-pole width ratios Rw at which the electromagnetic forces Ef become minimum, that are described in FIG. 5 and are each determined for each of the rotor skew angles X.

As shown in FIG. 6, it is found that, as the rotor skew angle X becomes larger, the tooth top width Y increases monotonically in a range of the rotor skew angle X less than 12.8 degrees, but turns to decrease monotonically in a range thereof more than 12.8 degrees. Thus, assuming a primary approximation straight line about the plots in a range of the rotor skew angle X less than 12.8 degrees and a primary approximation straight line about the plots in a range thereof more than 12.8 degrees, these plots are classified using as a boundary, the rotor skew angle X at which these straight lines are intersected with each other (=13.6 degrees).

In the case where the rotor skew angle X is not more than 13.6 degrees, the tooth top width Y is set to the calculation value Vc obtained by the formula (1), and in the case where the rotor skew angle X is more than 13.6 degrees, the tooth top width Y is set to the calculation value Vc obtained by the formula (2), so that an enhanced effect of reducing the electro-magnetic excitation force Ef is achieved.

$$Vc = f_1(X) = 0.276X + 69.0 \quad (1)$$

$$Vc = f_2(X) = -0.391X + 78.0 \quad (2)$$

Taking further into account the dimensional tolerance in manufacturing that is 0.2 degrees as a mechanical angle and the number of pole pairs P, it is desired to create a setting range having a width of ±0.2×P as an electric angle, for each of the calculation values Vc obtained according to the primary approximation straight lines expressed by the formula (1) and the formula (2). In this Embodiment, since the number of pole pairs P=12, it is desired that the rotor skew angle X be determined in the range of the calculation value Vc±2.4 degrees.

Namely, on a condition that the magnetic-pole width ratio Rw is 0.625 or less (this ratio applies even in a case without having the sub poles $32s$ (Ws=0, Rw=0)), the calculation value Vc is calculated using either one of the two linear formulas using the rotor skew angle X as a parameter (the formula (1) and the formula (2)) which are to be used differently according to the value of the rotor skew angle X. Then, the tooth top width Y is set to be in the range of ±0.2P with reference to the thus-calculated calculation value Vc. This makes it possible to exhibit an enhanced noise reduction effect even when only cuboid-shaped parallel-orientation permanent magnets 32 are used, so that the rotary electric machine can be manufactured at low cost.

As described above, the rotary electric machine 1 according to Embodiment 1 can exhibit an enhanced noise reduction effect even when only cuboid-shaped parallel-orientation permanent magnets 32 are used, so that it can be manufactured at low cost. Further, on the magnetic-gap facing portions of the rotor core 31, the cutouts $31n$ are each formed using a circumferential center position of the sub pole $32s$ as a reference position. Basically, the magnetic flux having passed through the sub pole $32s$ flows toward the main pole $32m$. Accordingly, since the cutouts $31n$ are each placed within the sub pole width Ws, it is possible to mitigate the stress on a radial bridge portion $31br$ (FIG. 1) facing the magnetic gap region Gm of the rotor core 31, without causing interference with the magnetic flux contributing to the torque, to thereby improve the toughness of the rotor core.

Further, the thickness of the radial bridge portion $31br$ (radial dimension) at the circumferential center position of the main pole $32m$, is larger than the thickness of the radial bridge portion $31br$ at the circumferential center position of the sub pole $32s$. The main pole $32m$ and the sub pole $32s$ are each constituted in such a manner that a permanent magnet is inserted in an axially penetrating hole created in the rotor core 31, and the main pole $32m$ is larger in width (circumferential dimension) and in thickness than the sub pole $32s$. Thus, the radial bridge portion $31br$ on the main pole $32m$ is subject to a force larger than that imposed on the radial bridge portion $31br$ on the sub pole $32s$, so that it is desired to make the thickness thereof larger than the thickness of the portion on the sub pole $32s$, to thereby enhance the toughness thereof.

Further, the minimum value of the thickness of the radial bridge portion $31br$ is larger than the minimum value of the thickness (circumferential dimension) of a circumferential bridge portion $31bc$. Because of the effect of centrifugal force, stress concentration is more likely to occur in the radial bridge portion $31br$ than in the circumferential bridge portion $31bc$, so that it is desired to make the thickness of the radial bridge portion than that of the circumferential bridge portion $31bc$.

Further, in the rotor core 31, the thickness (radial dimension) of its portion extending from the radially inner side of the permanent magnet 32 to the radially-inner structure part 34 (yoke portion) is half or less the main pole width Wm. In the main pole $32m$, a radially-directed magnetic flux flows toward the magnetic gap region Gm, and at the radially inner side of that pole, the magnetic flux is divided into right and left halves. Accordingly, when the thickness of the yoke portion is larger than half the main pole width Wm, lines of the magnetic flux become coarser than in the magnet portion, resulting in increased number of leakage magnetic-flux paths. Thus, the thickness of the yoke portion is set to half or less the main pole width Wm, so that it is possible to decrease the number of leakage magnetic-flux paths, to thereby increase the amount of the effective magnetic flux contributing to the torque. In addition, there are provided an effect of reducing the amount of iron used, thereby to reduce the iron loss occurring in the stator core 21 and thus to enhance the efficiency of the rotary electric machine 1; and an effect of reducing the inertia of the rotor 3, to thereby improve the control responsiveness thereof.

Embodiment 2

In Embodiment 1, a case has been described where, on the condition that the magnetic-pole width ratio is a specified value or less (this ratio applies even in a case without having the sub poles), the tooth top width is set to a value in a specified range with reference to the calculation value that is calculated by either one of two calculation formulas to be used differently according to the rotor skew angle. In Embodiment 2, a case will be described where the teeth each having a width set to a value larger than a calculation value that is the same as that calculated in Embodiment 1 under the same condition, and the teeth each having a width set to a value smaller than that calculation value, are differently used for axially-divided regions.

Figure 7:
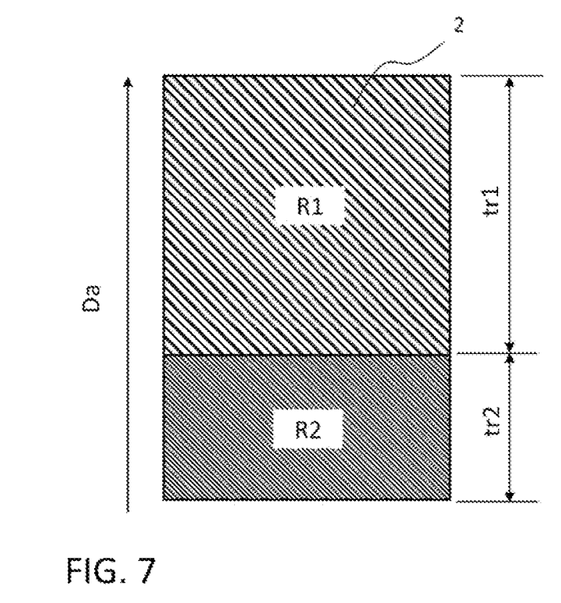
FIG. 7 is a schematic view for illustrating a configuration of a rotary electric machine according to Embodiment 2, showing how stator regions in a shaft longitudinal direction are configured in which setting values for the tooth top width are different from each other.

FIG. 7 serves for explaining a configuration of a rotary electric machine according to Embodiment 2, which is a schematic view corresponding to one side part of the stator core shown in FIG. 3A, and showing how the stator regions in the shaft longitudinal direction are configured in which setting values for the tooth top width are different from each other. Note that, other than the configuration of the axially-separated stator regions, the rotary electric machine is similar to that of Embodiment 1, so that FIGS. 1 to 6 used in Embodiment 1, as well as the formula (1), the formula (2) and the conditions to be differently applied to these formulas, are also employed here.

For example, when the tooth top width Y is continuously varied as a parameter, the phase of the electromagnetic excitation force Ef increases or decreases monotonically. Accordingly, when two or more types of tooth top widths Y are used in the stator 2, as shown in FIG. 7, the stator 2 is constituted by a region R1 having a first top width Y1 that is larger than the calculation value Vc and a region R2 having a second top width Y2 that is smaller than the calculation value Vc, so as to be separated in the axial direction Da. Specifically, the stator core sheets patterned with the first top width Y1 and the stator core sheets patterned with the second top width Y2 are stacked so as to be separated into two regions.

In this instance, when the first top width Y1 is set to a value exceeding the calculation value Vc but not more than 120 degrees and the second top width Y2 is set to a value not less than 60 degrees but less than the calculation value Vc, it is possible to cause the electromagnetic excitation forces Ef to be mutually counteracted based on the relationship between their phases, to thereby mitigate the distortion of the shaft due to the electromagnetic excitation force Ef. At this time, when the first top width Y1 is set to be larger than Vc+0.2P and the second top width Y2 is set to be smaller than Vc−0.2P, even with a manufacturing error, it is possible to cause the phases of the electro-magnetic excitation forces Ef in the respective regions R1 and R2, to be faced to surely counteract each other.

Furthermore, when a stacked thickness tr1 of the region R1 and the stacked thickness tr2 of the region R2 are allocated so that the ratio between these thicknesses is set inversely to a ratio between the amplitudes of the respective electromagnetic excitation forces Ef corresponding to the first top width Y1 and the second top width Y2, an effect is achieved. Namely, this makes it possible, like Embodiment 1, to exhibit an enhanced noise reduction effect even when only cuboid-shaped parallel-orientation permanent magnets 32 are used, so that the rotary electric machine can be manufactured at low cost.

Modified Examples

Figure 8A:
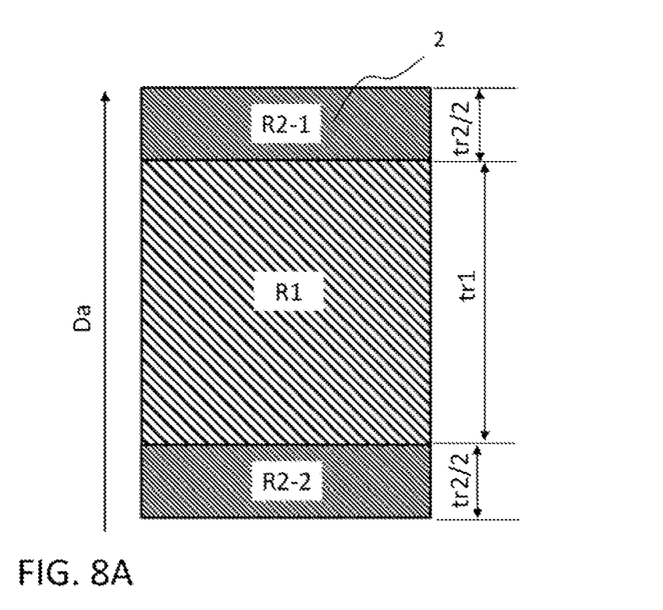
FIG. 8A and FIG. 8B are schematic views of rotary electric machines according to a first and second modified examples of Embodiment 2, respectively, each showing how stator regions in a shaft longitudinal direction are configured in which setting values for the tooth top width are different from each other.
Figure 8B:
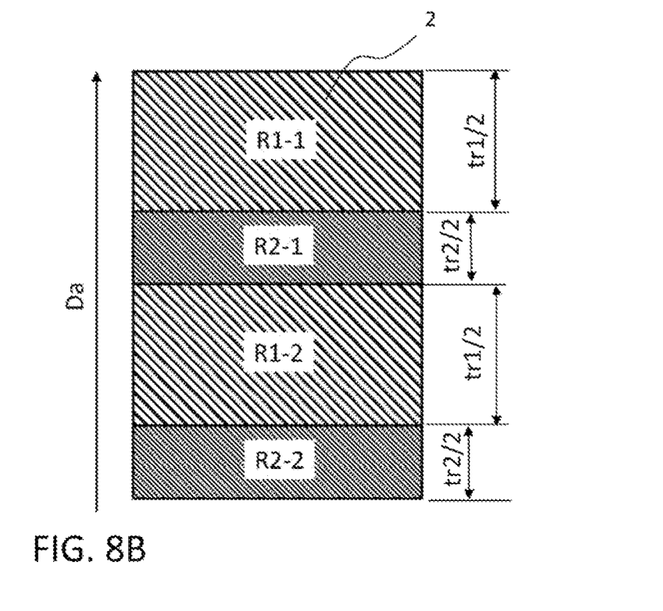

In the above Embodiment, a case has been described where two types of stator core sheets that are patterned with different tooth top widths are stacked so as to be axially separated into two regions. In this modified examples, a case will be described where the two types of these stator core sheets are stacked so as to be axially separated into three or four regions. FIG. 8A and FIG. 8B are schematic views corresponding to FIG. 7, of rotary electric machines according to first and second modified examples of Embodiment 2, respectively, each showing how the regions in the shaft longitudinal direction are configured in which setting values for the tooth top width are different from each other.

In the first modified example, as shown in FIG. 8A, the region R2 of stator core sheets pattered with the second top width Y2 is divided into two equal regions in the axial direction Da (a region R2-1 with a stacked thickness of tr2/2 and a region R2-2 with a stacked thickness of tr2/2). Here, the region R2-1 and the region R2-2 are stacked separately on both ends in the axial direction Da of the region R1 of stator core sheets patterned with the first top width Y1. Even in this case, it is possible to mitigate the distortion of the shaft due to the electromagnetic excitation force Ef.

In the second modified example, as shown in FIG. 8B, the region R2 of stator core sheets pattered with the second top width Y2 is divided into two equal regions in the axial direction Da (the region R2-1 and the region R2-2). In addition, the region R1 of stator core sheets pattered with the first top width Y1 is also divided into two equal regions in the axial direction Da (a region R1-1 with a stacked thickness of tr1/2 and a region R1-2 with a stacked thickness of tr1/2). Here, the region R2-2, the region R1-2, the region R2-1 and the region R1-2 are stacked so as to be arranged in this order along the axial direction Da. Even in this case, it is possible to mitigate the distortion of the shaft due to the electromagnetic excitation force Ef.

Embodiment 3

Figure 9:
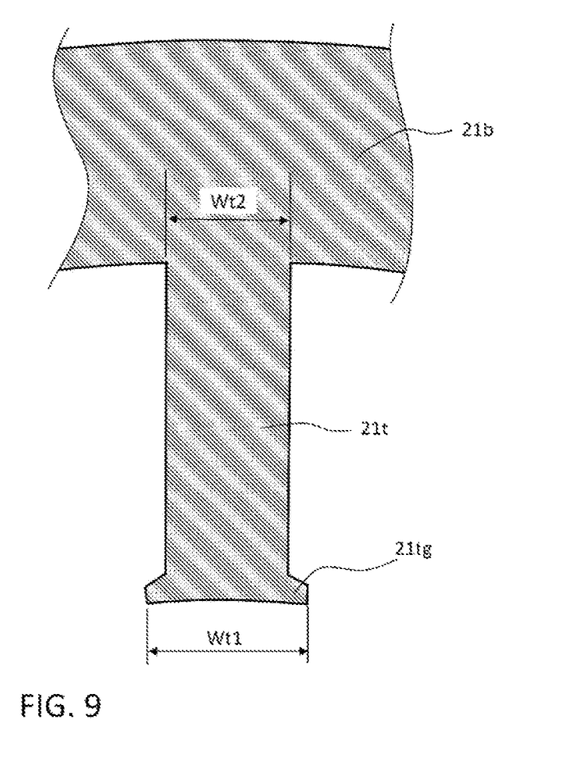
FIG. 9 is a partial sectional view for explaining a configuration of a rotary electric machine according to Embodiment 3, in which a cross-section of one tooth portion perpendicular to the axis is shown in an enlarged manner.
Figure 10:
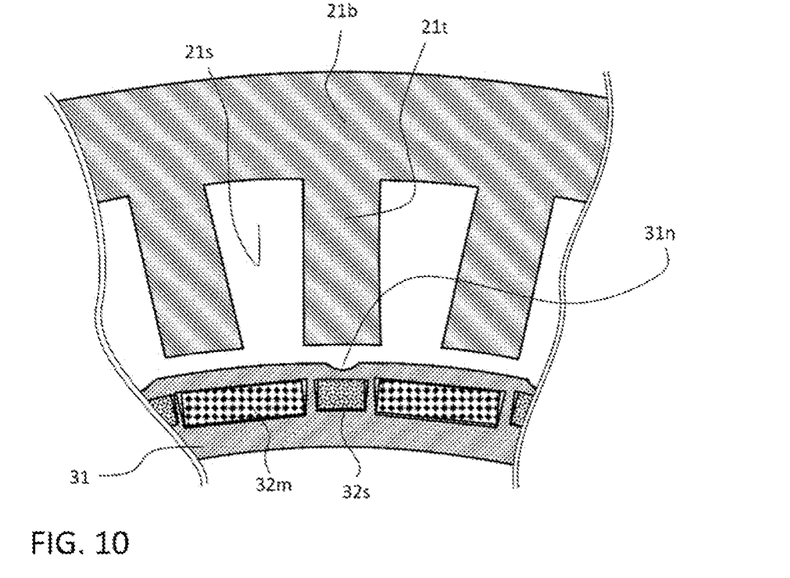
FIG. 10 is a partial sectional view for illustrating a configuration of the rotary electric machine according to Embodiment 3, in which a part of a cross-section thereof perpendicular to the axis is shown in an enlarged manner.

In Embodiments 1 and 2, the description has been made on how to set the tooth top width. In Embodiment 3, description will be made on how to set the dimensions of a tooth root portion and a tooth top portion that are each defined as a length perpendicular to the radial direction, separately from the tooth top width defined as an electric angle. FIG. 9 and FIG. 10 serve for explaining a configuration of a rotary electric machine according to Embodiment 3. FIG. 9 is a partial sectional view for defining widths of the tooth top portion and tooth root portion in a cross-section of a rotary electric machine perpendicular to its axis, in which one tooth portion is shown in an enlarged manner; and FIG. 10 is a partial sectional view corresponding to FIG. 1, for illustrating a configuration of the rotary electric machine according to Embodiment 3, in which a part of a cross-section thereof perpendicular to the axis is shown in an enlarged manner. Note that, other than the configuration of the teeth in the stator, the rotary electric machine is similar to that of Embodiment 1 or 2, so that FIGS. 2 to 6 used in Embodiment 1, or FIG. 7, FIG. 8A and FIG. 8B used in Embodiment 2 are also employed here.

The widths in the tooth 21t described in Embodiment 3 differ from the tooth top width Y defined in Embodiment 1 or 2. As shown in FIG. 9, a dimension of the top portion of the tooth 21t and a dimension of a portion where the tooth 21t is connected to the core back 21b (root), each as a length in a direction perpendicular to the radial direction and in a plane perpendicular to an axis of the tooth, are defined as a tooth-top lateral dimension Wt1 [mm] and a tooth-root lateral dimension Wt2 [mm], respectively. Here, the magnitude relationship between the tooth-top lateral dimension Wt1 and the tooth-root lateral dimension Wt2 may be set in any given manner, regardless of how the tooth top width Y is set.

In this regard, in Embodiment 3, in at least one of cross-sectional shapes (patterns of stator core sheets) that constitute the stator 2, the tooth-top lateral dimension Wt1 and the tooth-root lateral dimension Wt2 are made equal to each other as shown in FIG. 10. The configuration other than the above is similar to that in Embodiment 1. The shape in which the tooth-top lateral dimension Wt1 is equal to the tooth-root lateral dimension Wt2, corresponds to the calculation value Vc=69.0 degrees in FIG. 6 in the case where the rotor skew angle X is 0 degree. In this case, because the rotor skew can be eliminated, it is possible to improve the ease of manufacture, and further, because a fringe portion 21tg is not provided at the top of the tooth and thus a waistless tooth 21t is formed, it is possible to reduce the iron loss that would otherwise occur at around the fringe portion 21tg, to thereby improve the efficiency.

Embodiment 4

Figure 11:
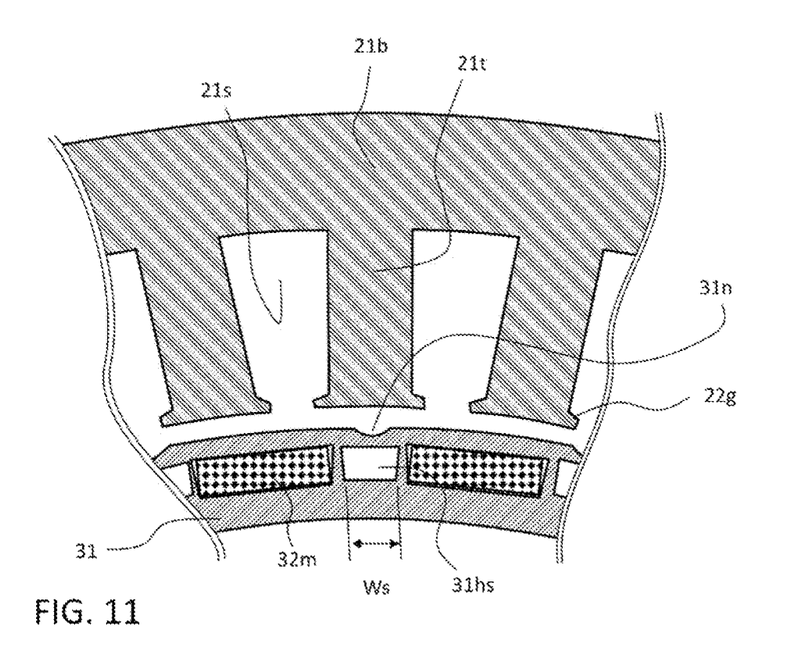
FIG. 11 is a partial sectional view for illustrating a configuration of a rotary electric machine according to Embodiment 4, in which a part of a cross-section thereof perpendicular to the axis is shown in an enlarged manner.

In Embodiment 1, a case has been described where permanent magnets are provided as the sub poles in the Halbach array structure. In Embodiment 4, a case will be described where sub-pole holes each being a space are used as the sub poles. FIG. 11 is a partial sectional view corresponding to FIG. 1, for illustrating a configuration of a rotary electric machine according to Embodiment 4, in which a part of a cross-section thereof perpendicular to the axis is shown in an enlarged manner. Note that, other than the configuration of the sub poles, the rotary electric machine is similar to that of Embodiment 1 or 2, so that FIGS. 2 to 6 used in Embodiment 1, or FIG. 7, FIG. 8A and FIG. 8B used in Embodiment 2 are also employed here.

In a rotary electric machine 1 according to Embodiment 4, as shown in FIG. 11, the sub poles are composed only of sub-pole holes 31hs without having permanent magnet members. The other configuration is similar to that in Embodiment 1. In Embodiment 3, the sub pole width Ws is defined as a circumferential width of the sub-pole hole 31$hs$ whose magnetic permeability is nearly equal to that of the permanent magnet member. Since there is no permanent magnet member as the sub pole 32$s$, it is possible to mitigate stress concentration on the rotor core 31, and to reduce the number of parts to thereby decrease the manufacturing cost.

Embodiment 5

Figure 12:
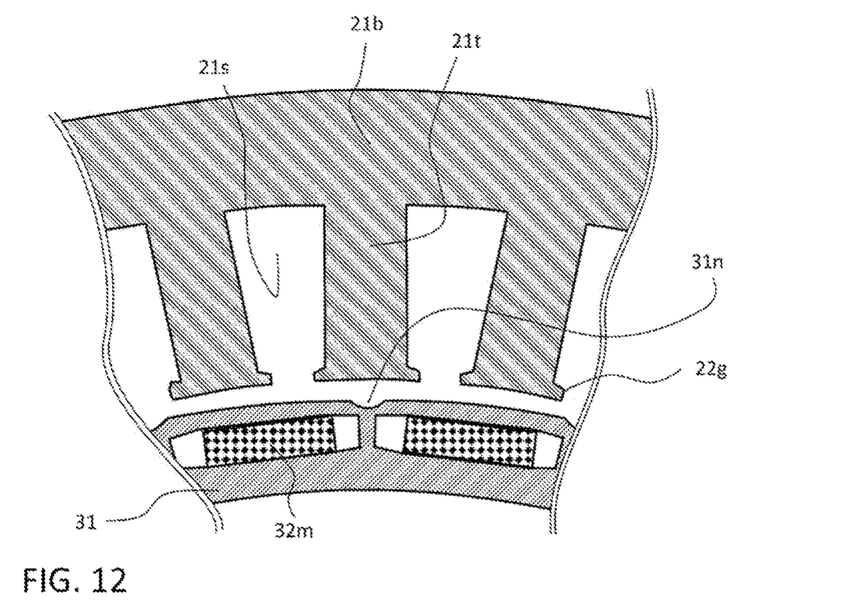
FIG. 12 is a partial sectional view for illustrating a configuration of a rotary electric machine according to Embodiment 5, in which a part of a cross-section thereof perpendicular to the axis is shown in an enlarged manner.

In Embodiment 5, a case without the provision of the sub poles will be described. FIG. 12 is a partial sectional view corresponding to FIG. 1, for illustrating a configuration of a rotary electric machine according to Embodiment 5, in which a part of a cross-section thereof perpendicular to the axis is shown in an enlarged manner. Note that, other than the configuration of the main poles and the sub poles, the rotary electric machine is similar to that of Embodiment 1 or 2, so that FIGS. 2 to 6 used in Embodiment 1, or FIG. 7, FIG. 8A and FIG. 8B used in Embodiment 2 are also employed here.

As shown in FIG. 12, a rotary electric machine 1 according to Embodiment 5 does not even have the sub-pole holes, namely, it corresponds to a case where the sub pole width Ws=0. The other configuration is similar to that in Embodiment 1. The sub-pole holes 31$hs$ and the permanent magnet members as the sub poles are eliminated, and in compensation for elimination of the sub poles 32$s$, the width (circumferential dimension) of each of the permanent magnet members as the main poles 32$m$ is enlarged. Accordingly, it can be expected to achieve a vibration reduction effect similar to that in Embodiment 1, while reducing the number of parts.

Embodiment 6

Figure 13:
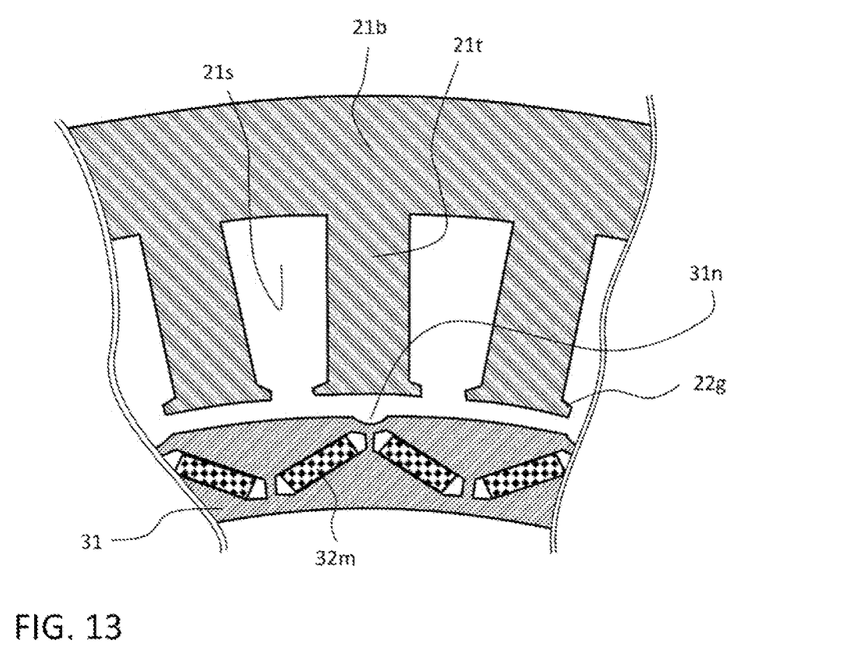
FIG. 13 is a partial sectional view for illustrating a configuration of a rotary electric machine according to Embodiment 6, in which a part of a cross-section thereof perpendicular to the axis is shown in an enlarged manner.

In the foregoing Embodiments 1 to 5, cases have been described where the permanent magnets are arranged so that, in a cross-section perpendicular to the axis, their respective long sides are perpendicular to the radial direction. In Embodiment 6, a case will be described where the sub poles are not provided as in Embodiment 5 and the permanent magnets are arranged so that their respective long sides are inclined from a direction perpendicular to the radial direction. FIG. 13 is a partial sectional view corresponding to FIG. 1, for illustrating a configuration of a rotary electric machine according to Embodiment 6, in which a part of a cross-section thereof perpendicular to the axis is shown in an enlarged manner. Note that, other than the configuration of the main poles and the sub poles, the rotary electric machine is similar to that of Embodiment 1 or 2, so that FIGS. 2 to 6 used in Embodiment 1, or FIG. 7, FIG. 8A and FIG. 8B used in Embodiment 2 are also employed here.

As shown in FIG. 13, a rotary electric machine 1 according to Embodiment 6 does not even have the sub-pole holes, namely, it corresponds to a case where the sub pole width Ws=0. Further, the rotary electric machine has a configuration in which the main poles 32$m$ are arranged so that, in a cross-section perpendicular to the axis, the long sides of adjacent two permanent magnets form a V-like shape. The other configuration is similar to that in Embodiment 1 or Embodiment 4.

Since the main poles are arranged so that the long sides as a pair forms a V-like shape, it is allowed to use more magnets than in the case where a single flat magnet is used instead of that pair. Thus, it can be expected to increase the power while achieving a vibration reduction effect similar to that in Embodiment 1.

It is noted that, in Embodiment 6, a case without having the sub-pole holes nor the permanent magnets as the sub poles, has been shown; however, even in a case of having the sub-pole holes 31$hs$ and/or the permanent magnets (sub poles 32$s$) circumferentially in between the respective main poles 32$m$ (namely, Ws>0), an effect similar to the above is achieved.

It should be noted that, in this application, exemplary embodiments are described; however, every characteristic, configuration or function that is described in the embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified and where at least one configuration element is added or omitted.

Further, although cases have been shown where the rotor has 24 poles and 36 slots, namely, 3 slots for each pole pair (three slots per two poles), even in a case where the rotor is composed of a combination of another number of poles and another number of slots, an effect similar to the above is achieved. Further, the description has been made assuming that the rotary electric machine is an IPM motor; however, the above method of setting the tooth top width Y according to the rotor skew angle X, is also applicable to an SPM motor (Surface Permanent Magnet motor).

As described above, the rotary electric machine 1 of this application comprises:

the rotor 3 which has the annular rotor core 31 and the multiple magnetic poles arranged in/on the rotor core 31 on the outer circumferential side thereof, and which is supported rotatably, said multiple magnetic poles being composed of main poles formed of the permanent magnets 32 whose magnetic fluxes at their respective magnetic-pole centers are each directed radially and sub poles whose magnetic fluxes at their respective magnetic-pole centers are each directed circumferentially, or being composed of the main poles without having the sub poles; and the stator 2 which forms a ring shape, which has the stator core 21 having the teeth 21$t$ projecting toward a radial center and arranged circumferentially and the armature windings 22 wound on the respective teeth 21$t$, and which is located coaxially with the rotor 3 to be spaced apart (magnetic gap region Gm) from the outer circumferential surface of the rotor;

wherein, on a condition that the ratio (magnetic-pole width ratio Rw) of the circumferential width of each of the sub poles 32$s$ (sub pole width Ws) to the circumferential width of each of the main poles 32$m$ (main pole width Wm) is 0.625 or less, provided that in a case without having the sub poles, the circumferential width of the sub pole 32$s$ (sub pole width Ws) is regarded as zero, the top width of each of the teeth 21$t$ (tooth top width Y) that is to be defined using an electric angle, is set on the basis of the calculation value Vc which is obtained, assuming that a rotor skew angle of the rotor is X degrees as an electric angle, provided that in a case where no skew is formed in the rotor 3, the skew angle X is regarded as zero degree, by a following formula (1) when X≤13.6, and by a following formula (2) when X>13.6.

$$Vc = 0.276X + 69.0 \tag{1}$$

$$Vc = -0.391X + 78.0 \tag{2}$$

Accordingly, it is possible to exhibit an enhanced noise reduction effect even when only cuboid-shaped parallel-orientation permanent magnets 32 are used, so that the rotary electric machine can be manufactured at low cost.

In particular, assuming that the number of pole pairs in the rotor 3 is P, when the top width (tooth top width Y) is set to meet the value of Vc±0.2P, the electromagnetic excitation force Ef becomes minimum in any one of the regions in the axial direction. Thus, it is possible to exhibit an enhanced noise reduction effect.

In another aspect, when the stator core 21 has a part in which the teeth 21t are formed with the first top width Y1 that is the width larger than the calculation value Vc and a part in which the teeth 21t are formed with the second top width Y2 that is the width smaller than the calculation value Vc, which are mutually stacked so as to be separated into axially-divided regions (region R1, region R2), the electromagnetic excitation forces Ef individually induced in these regions are mutually counteracted based on the relationship between their phases. Thus, the electro-magnetic excitation forces Ef become minimum as a whole. This makes it possible to exhibit an enhanced noise reduction effect.

At the same time, when the ratio between the axial length of the region where the teeth are formed with the first top width Y1 and the axial length of the region where the teeth are formed with the second top width Y2, is set inversely to the ratio between the amplitude of the zero-order spatial and sixth-order temporal component of an electromagnetic excitation force induced by the teeth with the first top width Y1 and the amplitude of that component induced by the teeth with the second top width Y2, the mutual counteraction effect will be maximized, so that the electromagnetic excitation forces Ef are more likely to become minimum as a whole. This makes it possible to exhibit an enhanced noise reduction effect.

In addition, when the first top width Y1 is 120 degrees or less as an electric angle and the second top width Y2 is 60 degrees or more as an electric angle, any excessive electromagnetic excitation force Ef is not locally induced and the electromagnetic excitation forces Ef induced individually in these regions are mutually counteracted based on the relationship between their phases. Thus, the electromagnetic excitation forces Ef become minimum as a whole. This makes it possible to exhibit an enhanced noise reduction effect.

Here, in a case of having the sub poles 32s, when, in the rotor 3, first permanent magnets serving as the main poles 32m and second permanent magnets serving as the sub poles 32s are arranged to form a Halbach array, it is possible to make the waveform of the radial magnetic-flux density in the magnetic gap region Gm more similar to a sinusoidal waveform, to thereby achieve increased power and noise reduction at the same time, more significantly.

Further, in a case of having the sub poles 32s, when the multiple magnetic poles are composed of first permanent magnets serving as the main poles 32m; and penetration holes (sub-pole holes 31hs) serving as the sub poles 32s which are each created as an axially penetrating space in a portion between the circumferentially adjacent main poles 32m, it is possible to mitigate stress concentration on the rotor core 31, and to reduce the number of parts.

In the case of having the sub poles 32s in the above-described manner, when the cutouts 31n are formed on the outer circumferential surface at positions each within a circumferential width of the sub pole 32s, it is possible to mitigate the stress on the radial bridge portion 31br facing the magnetic gap region Gm of the rotor core 31, without causing interference with the magnetic flux contributing to the torque, to thereby improve the toughness of the rotor core.

When, in one of the axially-divided regions of the stator core 21, the dimension of each of the teeth 21t which is perpendicular to the radial direction and in a plane perpendicular to an axis of that tooth 21t, is made constant from its root portion to its top portion, it is possible to constitute the stator core without the skew to thereby improve the ease of manufacture, and further to eliminate the fringe portion 21tg to thereby improve the ease of manufacture. In addition, it is possible to minimize the electromagnetic excitation force Ef.

In a case of having the skew, when the rotor skew angle X is not less than 12.8 degrees and not more than 18 degrees, it is possible to minimize the electromagnetic excitation force Ef, more effectively.

What is claimed is:

1. A rotary electric machine, comprising:
    a rotor which has an annular rotor core and multiple magnetic poles arranged in/on the rotor core on an outer circumferential side thereof, and in which skew is formed, and which is supported rotatably,
    said multiple magnetic poles being composed of main poles formed of permanent magnets whose magnetic fluxes at their respective magnetic-pole centers are each directed radially and sub poles whose magnetic fluxes at their respective magnetic-pole centers are each directed circumferentially, or being composed of the main poles without having the sub poles; and
    a stator which forms a ring shape, which has a stator core having teeth projecting toward a radial center and arranged circumferentially and armature windings wound on the respective teeth, and which is located coaxially with the rotor to be spaced apart from an outer circumferential surface of the rotor;
    wherein, a ratio of a circumferential width of each of the sub poles to a circumferential width of each of the main poles is 0.625 or less, provided that in a case without having the sub poles, the circumferential width of the sub pole is regarded as zero, wherein a top width of each of the teeth is set by a calculation value Vc which is obtained, by a rotor skew angle of the rotor being X degrees in an electric angle, by a following formula (1) when X≤13.6, and by a following formula (2) when X >13.6:

$$Vc = 0.276X + 69.0 \tag{1}$$

$$Vc = -0.391X + 78.0 \tag{2},$$

wherein, the top width is Vc±0.2P, where P is a number of pole pairs in the rotor, and
    wherein cutouts are formed on an outer circumferential surface of the rotor core at positions aligned in a radial direction with a circumferential center of each of the sub poles.

2. The rotary electric machine of claim 1, wherein the stator core has a part in which the teeth are formed with a first top width that is the width larger than the value Vc and a part in which the teeth are formed with a second top width that is the width smaller than the value Vc, which are mutually stacked so as to be separated into axially-divided regions.

3. The rotary electric machine of claim 2, wherein a ratio between an axial length of the region where the teeth are formed with the first top width and an axial length of the region where the teeth are formed with the second top width, is set inversely to a ratio between an amplitude of a zero-order spatial and sixth-order temporal component of an electromagnetic excitation force induced by the teeth with the first top width and an amplitude of that component induced by the teeth with the second top width.

4. The rotary electric machine of claim 3, wherein the first top width is 120 degrees or less as an electric angle, and the second top width is 60 degrees or more as an electric angle.

5. The rotary electric machine of claim 2, wherein the first top width is 120 degrees or less as an electric angle, and the second top width is 60 degrees or more as an electric angle.

6. The rotary electric machine of claim 2, wherein, in a case of having the sub poles, in the rotor, first permanent magnets serving as the main poles and second permanent magnets serving as the sub poles are arranged to form a Halbach array.

7. The rotary electric machine of claim 2, wherein, in a case of having the sub poles, the multiple magnetic poles are composed of first permanent magnets serving as the main poles, and penetration holes serving as the sub poles which are each created as an axially penetrating space in a portion between the circumferentially adjacent main poles.

8. The rotary electric machine of claim 1, wherein, in the rotor, first permanent magnets serving as the main poles and second permanent magnets serving as the sub poles are arranged to form a Halbach array.

9. The rotary electric machine of claim 1, wherein, in a case of having the sub poles, the multiple magnetic poles are composed of first permanent magnets serving as the main poles, and penetration holes serving as the sub poles which are each created as an axially penetrating space in a portion between the circumferentially adjacent main poles.

10. The rotary electric machine of claim 9, wherein cutouts are formed on the outer circumferential surface at positions each within a circumferential width of the sub pole.

11. The rotary electric machine of claim 1, wherein, in one of axially-divided regions of the stator core, a dimension of each of the teeth, which is perpendicular to a radial direction and in a plane perpendicular to an axis of that tooth, is constant from its root portion to its top portion.

12. The rotary electric machine of claim 1, wherein the rotor skew angle is not less than 12.8 degrees and not more than 18 degrees.

* * * * *